INVENTOR.
BENGT GUNNAR MAGNUSSON

Sept. 3, 1963  B. G. MAGNUSSON  3,102,977
REGULATED ELECTRIC POWER SUPPLY DEVICE
Filed July 9, 1959  3 Sheets-Sheet 2

INVENTOR.
BENGT GUNNAR MAGNUSSON
BY
ATTORNEYS

United States Patent Office 3,102,977
Patented Sept. 3, 1963

3,102,977
REGULATED ELECTRIC POWER SUPPLY DEVICE
Bengt Gunnar Magnusson, 15 Dejegatan,
Farsta-Stockholm, Sweden
Filed July 9, 1959, Ser. No. 826,079
Claims priority, application Sweden Aug. 29, 1958
8 Claims. (Cl. 321—19)

The present invention relates to an electric power supply device for deriving a direct voltage from an alternating voltage source, said direct voltage being substantially constant and independent of variations in the load and the voltage of the alternating voltage source.

The power supply device comprises a rectifier device which is adapted to be fed from the alternating voltage source, and a smoothing filter in the form of a four-terminal network connected between the output of the rectifier device and terminals to which the load is to be connected. According to the invention the device further comprises a transistor, an additional rectifier device, in the following called auxiliary rectifier device, which is also adapted to be fed from the alternating voltage source, a direct voltage source which delivers a constant reference voltage, and a summation circuit. The transistor is connected in series with the output circuit of the first-mentioned rectifier device. The summation circuit is arranged to sum up voltage across the load, the said reference voltage and the output voltage from the auxiliary rectifier device. The output voltage from the summation circuit is applied to the transistor as control voltage. This control voltage is such that the transistor effectively blocks the load current during a certain part of each half-cycle of the alternating voltage. If the load or the R.M.S. value of the alternating voltage varies, the said control voltage changes so that the time during which the transistor blocks the load current is decreased or increased, whereby the average value of the load direct current is increased or decreased respectively so that the voltage across the load remains substantially unchanged. Thus, the transistor serves as a switch which breaks and closes the load circuit at times determined by the control voltage.

The invention will be described more in particular in conjunction with the accompanying drawings.

Figure 1:
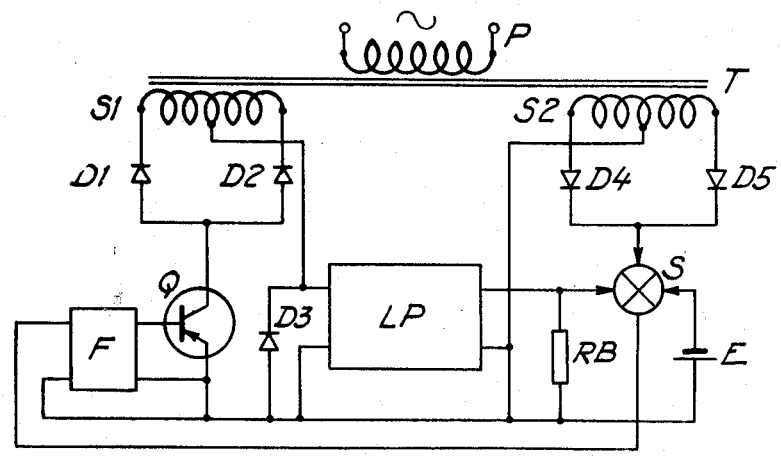
FIGURE 1 shows a circuit diagram of a power supply device according to the invention.
Figure 2:
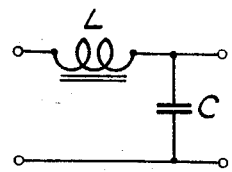
FIGURES 2 and 3 show different embodiments of the smoothing filter included in the device.
Figure 3:
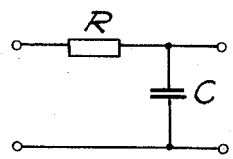

In FIGURE 1 T designates a transformer having a primary winding P and two secondary windings S1 and S2. Two rectifier diodes D1 and D2 are connected to the secondary winding S1 to form a full-wave rectifier. From this rectifier the desired D.C. power is applied to the load which is represented by a resistor RB in the figure. LP is a low pass filter for smoothing the voltage delivered by the rectifier D1—D2. The filter LP may be designed as shown in FIGURE 2 or FIGURE 3. In both cases the shunt branch of the filter consists of a capacitor C. The series branch of the filter consists in FIGURE 2 of a choke L and in FIGURE 3 of a resistor R.

A power transistor Q is connected with its emitter and collector in series with the load circuit of the rectifier D1—D2. Control voltage for the transistor Q is taken from the summation circuit S, is amplified in a D.C. amplifier F and applied to the transistor between its base and emitter. To the summation circuit S are connected direct voltage source E and a rectifier consisting of diodes D4 and D5 which are connected to the secondary winding S2 of the transformer and form the said auxiliary rectifier device. The direct voltage source E supplies a constant reference voltage and preferably consists of a zener diode connected to an ordinary D.C. source (not shown) which drives a current through the zener diode which in turn has such characteristics that the voltage drop across it becomes constant and within wide limits, is independent of the current through it.

The summation circuit S consists of circuit elements so interconnected that its output voltage which is to control the transistor Q, becomes equal to the algebraic sum of the direct voltage across the load RB, the reference voltage from source E and the pulsating direct voltage from rectifier D4—D5. The means for producing the control voltage are so dimensioned that the control voltage during each half-cycle of the alternating voltage varies between positive and negative values whereby the transistor will be conductive to the load current during a part of each half-cycle and block the load current during another part of each half-cycle.

If the filter LP is designed as shown in FIGURE 2, that is, has a choke in its series branch, a diode D3 should be shunted across the input of filter to maintain the continuity of the direct current through the choke when transistor Q breaks the load current. Diode D3 is not needed if the series branch of the filter is a pure resistance as shown in FIGURE 3.

The amplifier F may be an electron tube or transistor amplifier of known type which obtains the required operating power from rectifiers connected to additional windings (not shown) on transformer T.

Figure 4:
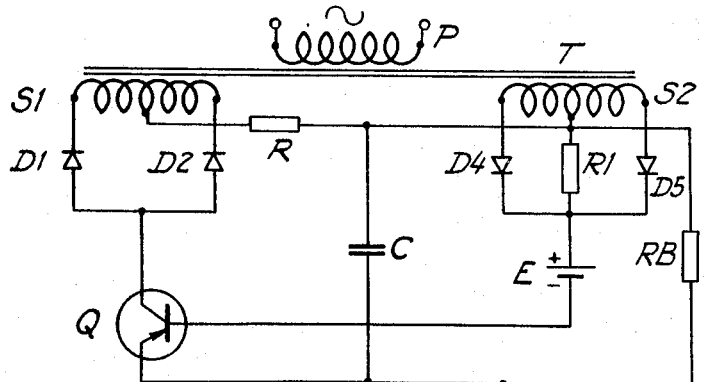
FIGURE 4 shows the circuit diagram of an embodiment of the invention.

In the embodiment according to FIGURE 4 the smoothing filter consists of a resistor R and a capacitor C. The summation circuit here comprises a resistor R1 which is connected across the output of the rectifier D4—D5. No amplifier for the control voltage of the transistor has been shown in FIGURE 4, but of course an amplifier may be provided in this embodiment also.

The mode of operation of the device will now be described with reference to the diagrams in FIGURES 5 to 8. The diagrams show voltages and currents as functions of time. The symbols in the diagrams have the following meanings:

U—direct voltage across load RB
E—direct voltage from source E
$e_1$—absolute value of the alternating voltage across either half of winding S1
$e_2$—absolute value of alternating voltage across either half of winding S2
$U_b$—control voltage between the base and emitter of transistor Q
$i_b$—base current of transistor Q
$i_k$—collector current of transistor Q
$\theta_k$—length of the collector current pulses ("current angle").

Figure 5:
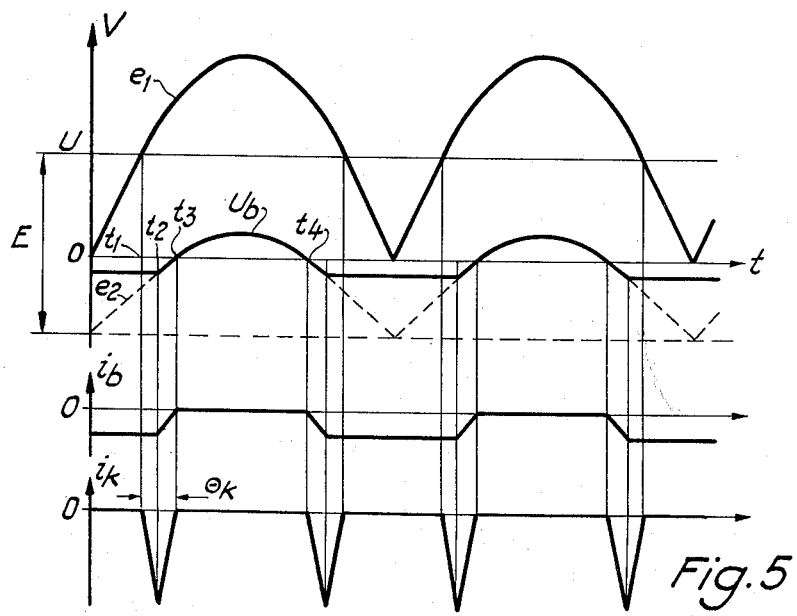
FIGURES 5 to 8 are graphs showing currents and voltages as functions of time in different embodiments of the invention.

The diagram of FIGURE 5 illustrates the mode of operation of the embodiment shown in FIGURE 4. The capacitor C has a capacity which is so large that the alternating voltage across it can be neglected. E is larger than U. The control voltage $U_b$ becomes equal to $U-E+$the voltage drop across R1. At the time $t=0$, when the alternating voltage changes polarity, the base of the transistor is at a negative potential with respect to the emitter, and a certain base current is then flowing which makes the transistor conductive. As long as $e_1$ is less than U diodes D1 and D2 are blocked, and therefore no collector current can flow during this interval.

When $e_1$ has reached a value equal to U at time $t_1$ collector current begins to flow. The base current passes through resistor R1 and causes a voltage drop in this resistor which keeps the diodes D4 and D5 blocked until the voltage $e_2$ has become equal to this voltage drop. This occurs at time $t_2$, and up to this time the voltage $U_b$ is substantially constant. At time $t_2$ $U_b$ begins to change in a positive sense, whereby the base current and the collector current begin to decrease. At time $t_3$ $U_b$ passes through zero, and the transistor is then cut off and remains in this condition till time $t_4$ when $U_b$ passes through zero again and becomes negative. The process is now repeated but in the reversed order.

Thus, for each half-cycle of the alternating voltage two current pulses are obtained in the collector circuit of the transistor, and the load current through RB becomes substantially equal to the time average value of the collector current. Obviously the average value becomes dependent on current angle $\theta_k$.

If the load RB is changed, the voltage U will also change somewhat. Hereby the points $t_1$ and $t_3$ will be displaced with respect to each other so that the current angle $\theta_k$ decreases if U increases and increases if U decreases. Hence a change of the current through the load is effected, and this change in the current is such that the change in the voltage is compensated for to an extent which is larger the larger current gain the transistor has. In order that a satisfactory stabilization shall be obtained the maximum value of $e_2$ should be much less than E so that a very small change in U causes a large change of $\theta_k$. If the ratio of collector current to base voltage ("transconductance" $i_k/U_b$) is very large, E needs only be slightly larger than U. In such case, however, the capacity of capacitor C must be sufficiently large so that the maximum value of the ripple across the capacitor does not become too large in relation to the maximum amplitude of voltage $e_2$.

If the voltage of the alternating voltage source connected to the primary of transformer T is changed, the voltages $e_1$ and $e_2$ are changed correspondingly. Hereby the points $t_1$ and $t_3$ are displaced in the same direction, but since $e_2$ is always flatter than $e_1$, the time $t_3$ will be displaced more than time $t_1$. Thus even in this case a change in the current angle $\theta_k$ occurs whereby the change in the voltage across the load is compensated for.

Figure 6:
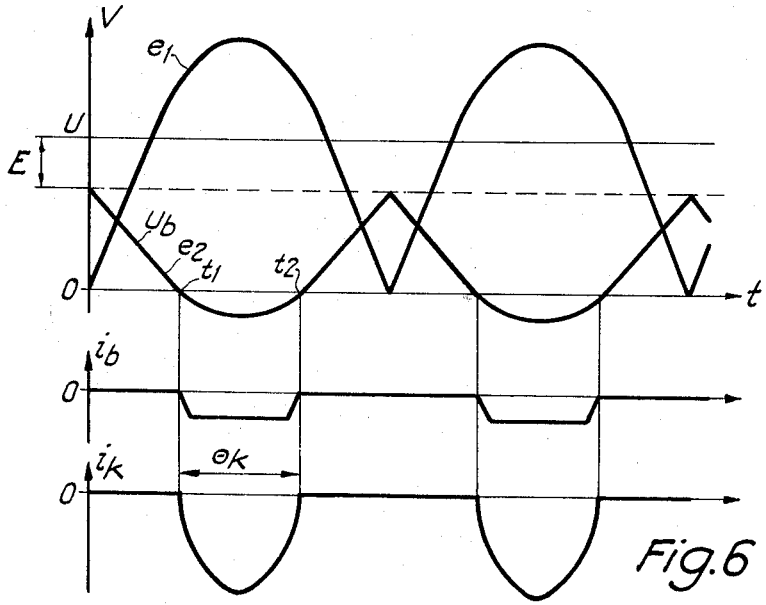

FIGURE 6 shows voltage and current diagrams for an embodiment of the invention which differs from that shown in FIGURE 4 in that the rectifier diodes D4 and D5 are connected with the forward direction opposite to that shown in FIGURE 4. In this case the voltage E is less than U. Thus, the control voltage $U_b$ at the base of transistor Q now becomes equal to $U-E-e_2$. $U_b$ is positive as long as $e_2$ is less than $U-E$, and transistor Q is then blocked. Between times $t_1$ and $t_2$ $U_b$ becomes negative, and the transistor then becomes conductive. It will be easily realized that in this case also a change in the load will cause a change in the current angle $\theta_k$ so that the change in the voltage across the load is opposed.

Figure 7:
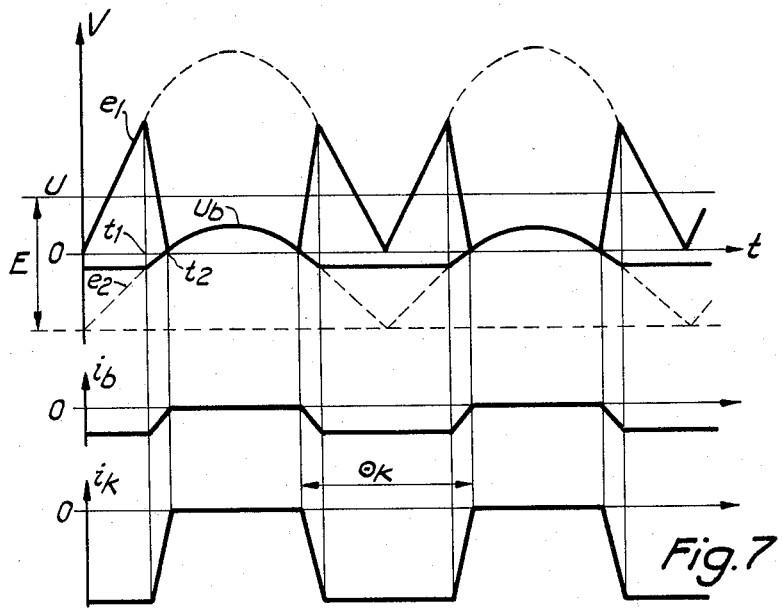

FIGURE 7 shows voltage and current diagrams for an embodiment of the invention in which the smoothing filter has a choke in the series branch and a diode (D3 in FIGURE 1) connected across the input of the filter. In other respects this embodiment agrees to that shown in FIGURE 4. The base voltage $U_b$ and the base current $i_b$ of transistor Q here vary in the same manner as shown in FIGURE 5. Collector current $i_k$ however, will now flow as long as base current flows. This is due to the influence of the filter choke which, because of its inductance, opposes any change in the current therethrough. When the base current has dropped to zero and the transistor is consequently blocked, the choke drives current through the diode shunted across the input of the filter. The voltage across the input of the filter follows voltage $e_1$ till time $t_1$ and then drops to practically zero and remains at this value till the transistor begins to conduct again. The direct voltage after filtering in the L-C-filter becomes equal to the time average value of this input voltage.

Figure 8:
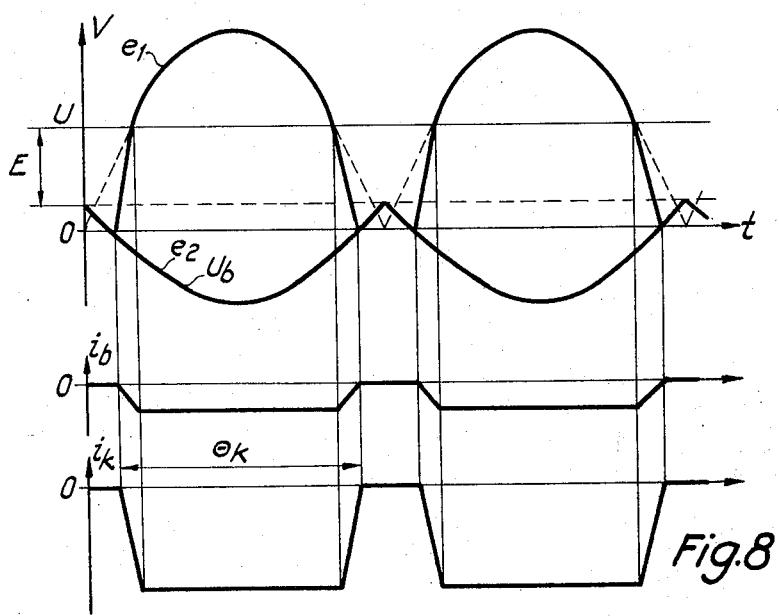

FIGURE 8 shows voltage and current diagrams for an embodiment of the invention in which the smoothing filter has a choke in the series branch and a diode D3 connected across the input of the filter, and in which the diodes D4 and D5 are connected with their forward direction opposite to that shown in FIGURE 4. This diagram resembles the diagram of FIGURE 6, but the collector current has here a wave shape different from that shown in FIGURE 6 due to the effect of the choke.

Transistor Q will operate as a contact which alternately interrupts and closes the load circuit. Therefore it is possible to control load powers which are considerably larger than the loss power of the transistor, since the transistor when conducting takes up only a small voltage drop and when blocked passes only a very small leakage current. The efficiency of the power supply device is primarily determined by the losses in the transformer windings and in the series branch of filter LP. If the series branch is a resistor (R in FIGURES 2 and 4), the losses may amount to 10 to 90% of the load power. The efficiency is improved if the filter has a choke (L in FIGURE 3) instead of a resistor in the series branch, because the resistance of the choke can be made small and the wave shape of the collector current is improved.

While the transistor Q is represented in FIGURES 1 and 4 by the symbol indicating a transistor of the p-n-p type, a transistor of the n-p-n type can of course be used as well, provided that the polarities of the D.C. source and diodes are reversed.

The transistor Q may also be of the p-n-p-n type which has a characteristic similar to that of the thyratron, that is, when current control begins to flow in the p-n-p-n transistor, the transistor becomes conductive and remains conductive until the collector-emitter voltage drops to zero even if the control current should cease before this occurs.

What is claimed is:

1. A power supply device for deriving a stabilized direct voltage from an alternating voltage source, comprising in combination: rectifying means connected to said alternating voltage source; an output circuit for said rectifying means including filter means and output terminals for connecting a load to the device; a transistor having a plurality of electrodes, one being a control electrode; means connecting said transistor in series with said output circuit; a reference voltage source for producing a substantially constant reference voltage; means for deriving from said alternating voltage source a pulsating voltage with a wave-shape having sloping parts; a control circuit extending between a control electrode and another electrode of said transistor; said control circuit including said reference voltage source, said output terminals and means for applying said pulsating voltage in series into said circuit; said reference voltage having such polarity and magnitude in relation to the desired voltage across said output terminals that the resulting voltage between said control electrode and said other electrode of the transistor changes polarity during each pulsation of said pulsating voltage, thereby causing collector-emitter current path through the transistor to be alternately cut off and conductive.

2. The power supply device as claimed in claim 1 in which said filter means consists of a four-terminal network having a resistor in a series branch and a capacitor in a shunt branch.

3. The power supply device as claimed in claim 1 in which said filter means consists of a four terminal network having a choke in a series branch and a capacitor in a shunt branch, and in which a rectifier is connected across the input terminals of the four-terminal network.

4. The power supply device as claimed in claim 1 wherein the magnitude of the reference voltage is less than the magnitude of said stabilized direct voltage, and the polarity of the reference voltage is the same as the polarity of said pulsating voltage.

5. The power supply device as claimed in claim 1 wherein the magnitude of the reference voltage is larger than the magnitude of said stabilized direct voltage, and the polarity of the reference voltage is the opposite from the polarity of said pulsating voltage.

6. A power supply device for deriving a stabilized direct voltage from an alternating voltage source, comprising: first rectifying means connected to said alternating voltage source; filter means for smoothing the output voltage from said first rectifying means; direct current output terminals connected to said filter means; a transistor connected in series with the output circuit from said first rectifying means; a voltage source for producing a constant direct reference voltage; second rectifying means connected to said alternating voltage source for producing a pulsating direct voltage; a summation circuit arranged to sum up the direct voltage across said output terminals, said reference voltage and said pulsating direct voltage to produce therefrom a varying voltage, the polarity of which changes during each half cycle of the alternating voltage at times depending on the difference between the direct voltage across said output terminals and said reference voltage; and means for applying said varying voltage to control said transistor to cause the transistor to be alternately cut off and made conductive at the times for polarity changes of said varying voltage.

7. A power supply device for deriving a stabilized direct voltage from an alternating current source, comprising in combination: first rectifying means connected to said alternating voltage source; an output circuit for said first rectifying means including filter means and output terminals for connecting a load to the device; a transistor including base, emitter and collector electrodes and having its collector-emitter current path connected in series with said output circuit; a control circuit extending between the base electrode and one of the other electrodes of said transistor, said control circuit including in series combination said output terminals and resistance means and a source of substantially constant reference voltage; and second rectifying means connected to said alternating voltage source and having its output connected to said resistance means to produce a pulsating voltage across said resistance means; said reference voltage having such a polarity and magnitude in relation to the voltage across said output terminals that the resulting voltage between the base and said other electrode of the transistor changes polarity during each half cycle of said alternating voltage thereby causing the collector-emitter current path of the transistor to become alternately conductive and cut off.

8. The power supply device as claimed in claim 7 in which an amplifier is included in said control circuit for amplifying the voltage applied between the base and said other electrode of the transistor.

References Cited in the file of this patent
UNITED STATES PATENTS

| | | |
|---|---|---|
| 2,815,479 | Rechnitzer | Dec. 3, 1957 |
| 2,886,761 | Rabier | May 12, 1959 |
| 2,936,413 | Searcy | May 10, 1960 |
| 2,942,174 | Harrison | June 12, 1960 |